US008234255B1

(12) United States Patent
Narayanaswamy et al.

(10) Patent No.: US 8,234,255 B1
(45) Date of Patent: Jul. 31, 2012

(54) REDUCING DATA TRANSFER FOR MATCHING PATTERNS

(75) Inventors: Krishna Narayanaswamy, San Jose, CA (US); Sunil Ravi, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 414 days.

(21) Appl. No.: 12/194,712

(22) Filed: Aug. 20, 2008

(51) Int. Cl.
*G06F 7/00* (2006.01)
(52) U.S. Cl. ...................................................... 707/688
(58) Field of Classification Search .................. 707/688, 707/694
See application file for complete search history.

(56) References Cited

U.S. PATENT DOCUMENTS

2003/0004688 A1*  1/2003  Gupta et al. .................. 702/188
2006/0075317 A1*  4/2006  Chindamo et al. ............ 714/726

\* cited by examiner

*Primary Examiner* — Truong Vo
(74) *Attorney, Agent, or Firm* — Harrity & Harrity, LLP

(57) ABSTRACT

A device may receive a packet, obtain data from the packet, store the data in a memory, and send a request to match a portion of the data to a set of patterns, the request identifying the portion in the memory. In addition, the device may access the portion in the memory based on the request, compare the accessed portion to the set of patterns, generate a result by comparing the accessed portion to the set of patterns, and output the result.

18 Claims, 12 Drawing Sheets

REDUCING DATA TRANSFER FOR MATCHING PATTERNS

BACKGROUND

When a network device receives a packet, the network device typically examines one or more portions of the packet (e.g., header, payload, etc.) to ensure that the packet does not pose a security threat. In examining the portions, the network device matches the portions against known patterns (e.g., a virus pattern, a software vulnerability pattern, etc.) based on a user configured policy. If the portions contain one of the patterns, the device extracts a flow signature (e.g., a tuple including a source address, a destination address, a source port number, a destination port number, a protocol name, etc.) from the packet. Henceforth, the device may drop packets that bear the same flow signature and/or sample the packets for further analysis.

SUMMARY

According to one aspect, a method may include receiving a packet, obtaining data from the packet, storing the data in a memory, sending a request to match a portion of the data to a set of patterns, the request identifying the portion in the memory, accessing the portion in the memory based on the request, comparing the accessed portion to the set of patterns, generating a result by comparing the accessed portion to the set of patterns, and outputting the result.

According to another aspect, a device may include a shared memory, a patterns memory to store a set of patterns, a client, and a server. The client may be configured to receive a packet, extract data from the packet, store the data in the shared memory, output a first request for matching a first portion of the data to the set of patterns in the patterns memory, and output a second request for matching a second portion of the data to the set of patterns in the patterns memory. The server may be configured to access the first portion from the shared memory based on the first request, match the first portion to the set of patterns in the patterns memory to obtain a first result, access the second portion from the shared memory based on the second request, match the second portion to the set of patterns in the patterns memory to obtain the second result, and send the first result and the second result to the client.

According to yet another aspect, a device may include means for loading a set of patterns for a pattern matching service into a first memory, means for receiving a packet, means for storing data from the packet in a second memory, means for receiving requests for matching patterns, each of the requests identifying a location of a corresponding portion of the data in the second memory and asking for the corresponding portion to be matched to the set of patterns in the first memory, and means for providing, to the client, for each of the requests, a result of matching the corresponding portion to the set of patterns.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements. The term "packet," as used herein, may refer to a packet, a datagram, or a cell; a fragment of a packet, a datagram or a cell; or other types of data. As used herein, a request may include a message. Depending on context, the term "pattern match request" or "request," as used herein, may refer to a message requesting a component or a device to provide a list of patterns that match data.

OVERVIEW

Figure 1A:
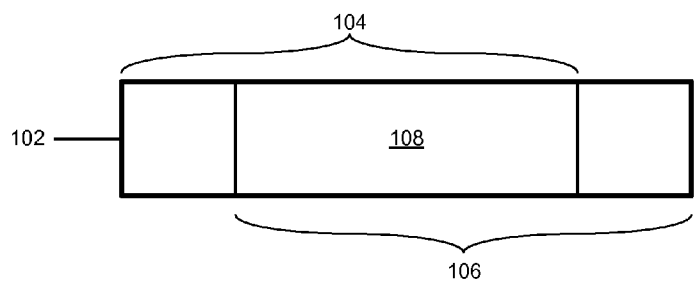
FIG. 1A is a block diagram of portions of an exemplary packet.

As described below, a device may reduce transfer of data within the device for matching patterns. FIG. 1A is a block diagram of a data portion 102 of an exemplary packet. Data portion 102 may include any part, or all, of the packet. As shown in FIG. 1A, portion 102 may include portion 104 and portion 106. Each of portions 104 and 106 may include a common portion 108.

Figure 1B:
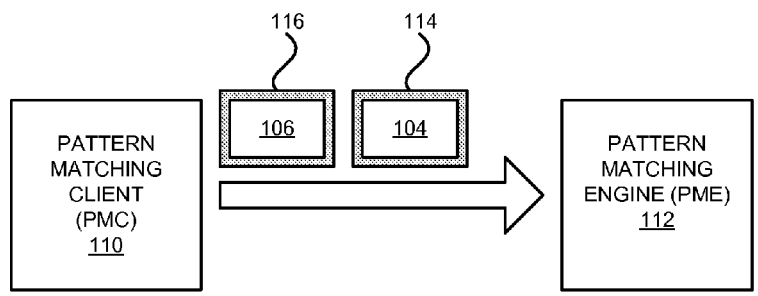
FIG. 1B illustrates one implementation of an exemplary device.

FIG. 1B illustrates one implementation of the device. As shown, the device may include a pattern matching client (PMC) 110 and a pattern matching engine (PME) 112. PMC 110 may include a software and/or hardware component that sends a pattern match request (e.g., a request to match data against a set of configured virus/vulnerability patterns) to PME 112 though communication/data paths that are internal to the device. PME 112 may include a software and/or hardware component that receives the pattern match request. The request may specify data and a set of patterns in a pattern database to match to the data. In response to the request, PME 112 may match the data to the specified patterns, and may send a result of the match to PMC 110.

As further shown in FIG. 1B, to match portions 104 and 106 to the specified set of patterns, PMC 110 may send requests 114 and 116 to PME 112. Although FIG. 1B shows requests 114 and 116 as including portions 104 and 106, respectively, requests 114 and 116 may include additional information/data than that depicted in FIG. 1B. In FIG. 1B, because each of portions 104 and 106 includes common portion 108, common portion 108 may be sent twice, once in request 114 and once in request 116.

Figure 1C:
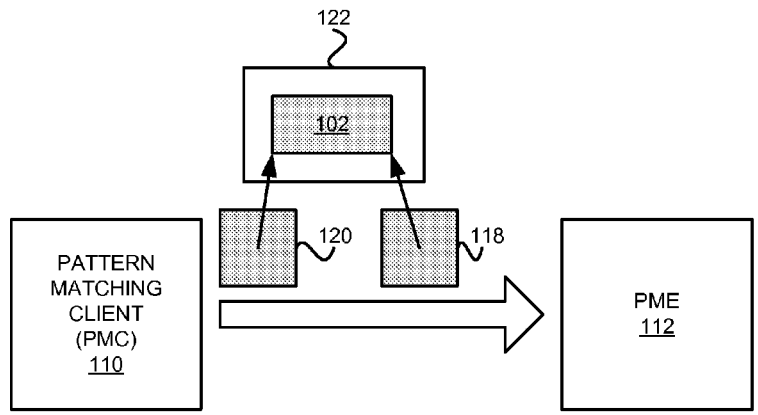
FIG. 1C illustrates another implementation of the exemplary device of FIG. 1B.

FIG. 1C illustrates another implementation of the device. As shown, to match portions 104 and 106 to patterns, PMC 110 may copy portion 102 to a shared memory 130 that is commonly accessible to PMC 110 and PME 112. In addition, PMC 110 may send requests 118 and 120 to PME 112. As further shown, while each of requests 118 and 120 may not include portion 102, each of requests 118 and 120 may reference any part, of portion 102, that is to be matched to the patterns. This is indicated by an arrow extending from each of requests 118 and 120 to a copy of portion 102 in shared memory 130.

In the implementation illustrated in FIG. 1C, request 118 may instruct PME 112 to match portion 104 in portion 102 of the exemplar packet to the specified patterns. Similarly, request 120 may instruct PME 112 to match portion 106 within portion 102 to the known patterns.

In the above, PME 112 in FIG. 1C may produce the same result in response to requests 118 and 120 as PME 112 in FIG. 1B to requests 114 and 116. However, in FIG. 1C, the device may transfer common portion 108 once (e.g., copy portion 102 to shared memory 130), whereas, in FIG. 1B, the device may transfer common portion 108 twice (e.g., in requests 114 and 116).

By reducing the transfer of data within the device, the device may reduce average bandwidth use of internal communication/data paths and/or may save processing cycles, per pattern match request. Such reduction in resource utilization may enable the device to avoid performance degradations and/or process additional packets in a high traffic environment.

Exemplary Network

Figure 2:
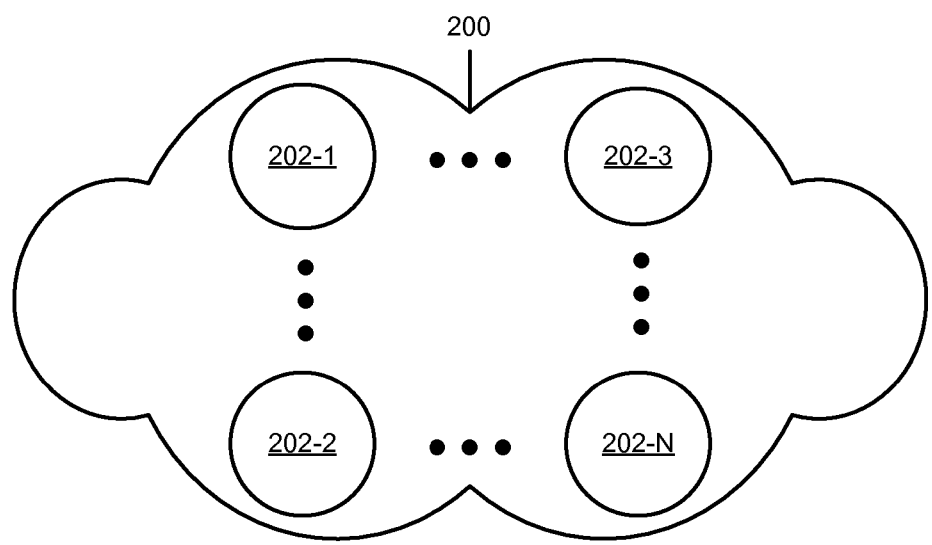
FIG. 2 is a diagram of an exemplary network in which concepts described herein may be implemented.

FIG. 2 illustrates a network 200 in which concepts described herein may be implemented. Network 200 may include the Internet, an intranet, a local area network (LAN), a wide area network (WAN), a metropolitan area network (MAN), a cellular network, a public switched telephone network (PSTN), an ad hoc network, any other network, or a combination of one or more networks.

As shown in FIG. 2, network 200 may include devices 202-1 through 202-N (individually referred to herein as a device 202-$x$). Device 202-$x$ may include, for example, a router, a switch, a gateway, a server, a personal computer, etc. Although device 202-$x$ may be implemented as any network device, in the following description, device 202-$x$ will be described in terms of a router or a switch.

Figure 3:
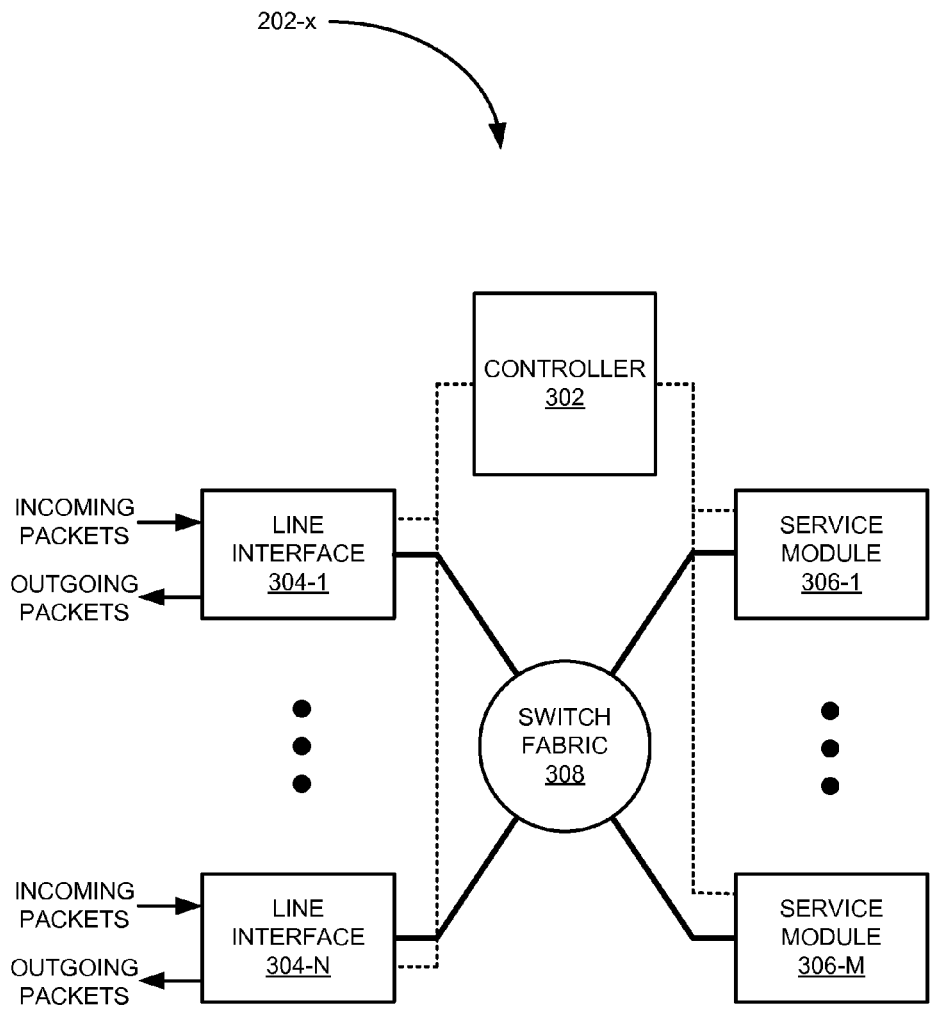
FIG. 3 is a block diagram of an exemplary device of FIG. 2.

FIG. 3 illustrates exemplary components of device 202-$x$. As shown, device 202-$x$ may include a controller 302, line interfaces 304-1 through 304-N (collectively referred to herein as line interfaces 304 and individually as line interface 304-$x$), service modules (collectively referred to herein as service modules 306 and individually as service module 306-$x$), and a switch fabric 308. Depending on context, the term, "component," as used herein, may refer to one of software and/or hardware parts of a device. Device 202-$x$ may include fewer, additional, and/or different components than shown in FIG. 3. For example, device 202-$x$ may include additional or fewer line interfaces or additional controllers, and/or service modules.

Controller 302 may include one or more components for managing routes and/or types of information that may require centralized processing. For example, controller 302 may manage routes (e.g., may accept or disseminate routes to other devices 202) in accordance with routing/signaling protocols, may receive and process statistics related to packets, and/or may process packet samples from other components of device 202-$x$ (e.g., from line interfaces 304).

Line interface 304-$x$ may include one or more components for receiving packets from devices in network 200 and for transmitting the packets to other devices in network 200. In addition, line interface 304-$x$ may forward packets, classify packets, redirect packets to other components in device 202-$x$, manage a table of packet statistics, and/or sample packets.

Service module 306-$x$ may include one or more components for rendering a particular service for a received packet. In processing the packet, service module 306-$x$ may select one or more portions of the packet and perform a pattern match to detect one or more attacks (e.g., a virus). After processing the packet, service module 306-$x$ may drop the packet or direct the packet to another of service modules 306 or one of line interfaces 304. Examples of service module 306-$x$ may include an anti-virus service module, a firewall service module, an intrusion detection service module, an encryption/decryption service module, a data loss prevention module (e.g., an information leak prevention module, an extrusion prevention system, etc.), and/or other types of service modules.

Switch fabric 308 may include one or more switches for conveying packets from one of line interfaces 304 and/or service modules 306 to another of line interfaces 304 and/or service modules 306.

Figure 4:
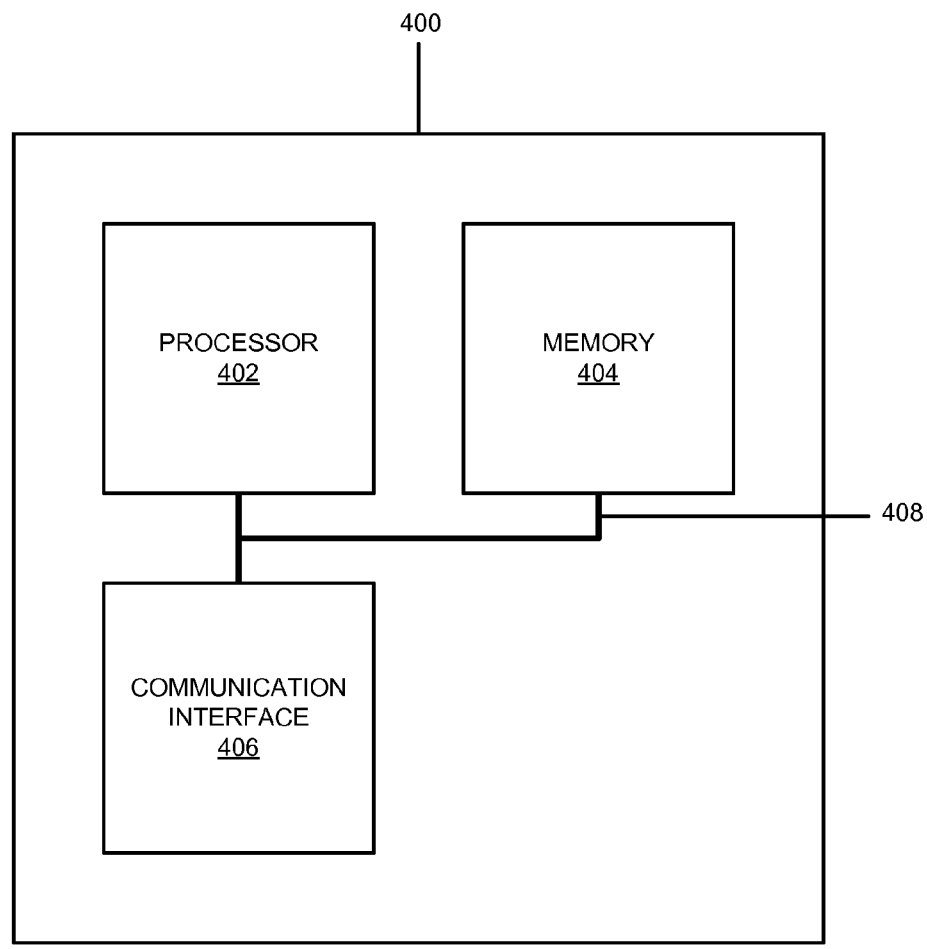
FIG. 4 is a block diagram of an exemplary component of FIG. 3.

FIG. 4 illustrates an exemplary component 400 in device 202-$x$. Component 400 may represent any one of controller 302, line interfaces 304, and/or service modules 306. As shown, component 400 may include a processor 402, a memory 404, and a communication interface 406, and a communication/data path 408. In different implementations, component 400 may include additional, fewer, different, or differently arranged components than the ones illustrated in FIG. 4.

Processor 402 may include a processor, a microprocessor, an Application Specific Integrated Circuit (ASIC), a Field Programmable Gate Array (FPGA), and/or other processing logic capable of controlling component 400. In some implementations, processor 402 may include hardware, such as a co-processor, for matching data to patterns.

Memory 404 may include content addressable memory (CAM), static memory, such as read only memory (ROM), and/or dynamic memory, such as random access memory (RAM) or onboard cache, for storing data (e.g., patterns) and machine-readable instructions. Memory 404 may also include storage devices, such as a hard disk, a flash memory, as well as other types of storage devices. Depending on the implementation, portions of memory 404 may be directly addressable by processor 402 or components in processor 402 (e.g., a co-processor for matching patterns to data).

Communication interface 406 may include any transceiver-like mechanism that enables device 202-$x$ to communicate with other components and/or devices. Communication/data path 408 may provide an interface through which components of component 400 and/or device 202-$x$ can communicate with one another.

Figure 5:
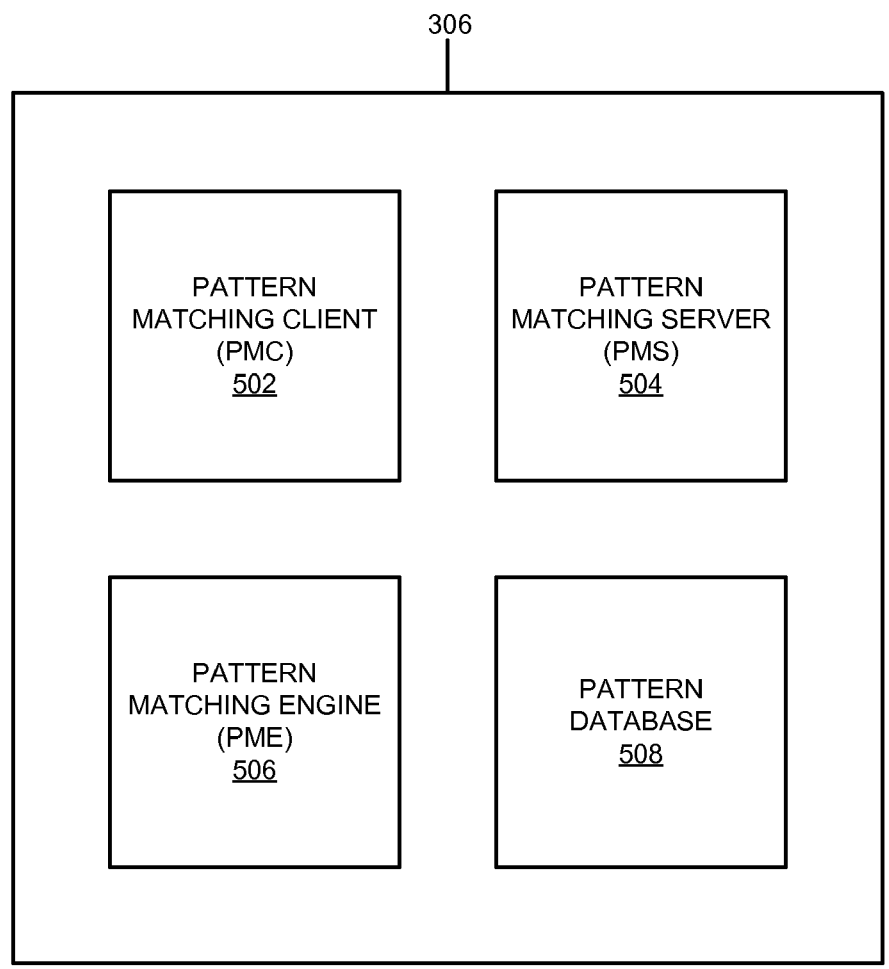
FIG. 5 is a functional block diagram of an exemplary service module of FIG. 3.

FIG. 5 is a functional block diagram of service module 306-$x$. As shown, service module 306-$x$ may include a pattern matching client (PMC) 502, a pattern matching server (PMS) 504, a pattern matching engine (PME) 506, and a pattern database 508. Depending on the implementation, service module 306-*x* may include additional, fewer, or different components than those illustrated in FIG. 5 (e.g., a specialized software module for an intrusion detection system).

PMC 502 may include a hardware and/or software component that may be associated with sending pattern match requests to PMS 504, receiving a result of matching patterns from PMS 504, and processing the result. In one implementation, PMC 502 may perform these functions by providing support for procedures (e.g., threads, programs, subroutines, methods, scripts, etc.) that may be invoked via a set of pattern match application programming interfaces (APIs).

Figure 6A:
FIG. 6A shows a table of exemplary application programming interfaces that a pattern matching client (PMC) of FIG. 5 may invoke.

FIG. 6A illustrates a set of exemplary pattern match APIs 602 for invoking procedures that support functions associated with matching data to patterns. Pattern match APIs 602 in FIG. 6A are for illustration, and may be implemented in forms different from the ones illustrated in FIG. 6A.

As shown, pattern match APIs 602 may include REGISTER( )604, UNREGISTER( ) 606, INITIALIZE( )608, SHUTDOWN( )610, LOAD_PATTERNS 612, UNLOAD_PATTERNS ( )614, CREATE_MATCH_CONTEXT( )616, DESTROY_MATCH_CONTEXT( )618, REQUEST_MATCH( )620, and STOP_SESSION( )622. In FIG. 6A, for each API, an argument list may be presented, as denoted by "( )" (e.g., an argument list of INITIALIZE( )608 is shown by "( )").

REGISTER( )604 may include an interface for invoking a procedure (e.g., a method, a function, a subroutine, a thread, a script, a program, etc.) for PMC 502 to identify itself to PMS 504. In addition, PMC 502 may receive, in response to calling REGISTER( )604, one of more identifiers that are associated with registration of PMC 502 from PMS 504. When PMC 502 invokes REGISTER( )604, PMS 504 may allocate system resources (e.g., locks, memory, etc.) for PMC 502.

UNREGISTER( )606 may include an interface for invoking a procedure for deallocating system resources that may have been allocated by PMS 504 via an invocation of REGISTER( )604. INITIALIZE ( )608 may include an interface for invoking a procedure for allocating system resources and/or setting values for parameters (e.g., a maximum number of requests that may wait in a queue before PMS 504 relays one or more of the requests to PME 506) that are related to processing pattern match requests at PMS 504.

SHUTDOWN( )610 may include an interface for invoking a procedure for deallocating system resources (e.g., memory) that may have been allocated via INITIALIZE( ) 608. In some implementations, when PMC 502 calls SHUTDOWN( )610, PMS 504 or PME 506 may finish processing pending requests from PMC 502 before PMS 504 deallocates the resources. In a different implementation, PMC 502 may cancel the pending requests.

LOAD_PATTERNS 612 may include an interface for invoking a procedure for causing PME 506 to transfer a set of patterns from a pattern database to a dynamic memory (e.g., RAM). Once loaded in the dynamic memory, PME 506 may match data to the set of patterns. UNLOAD_PATTERNS 614 may include an interface for invoking a procedure for causing PME 506 to remove a set of patterns that are loaded in a dynamic memory.

CREATE_MATCH_CONTEXT( )616 may include an interface for invoking a procedure for creating a context (e.g., a block of memory for storing information related to a series of pattern match requests). The context may be used in issuing a series of related pattern match requests. For example, if PMC 502 issues two pattern match requests (e.g., requests 118 and 120 in FIG. 1C) to PMS 504, the same context may be used to issue both requests.

The context may include, for example, a session identifier that may be assigned to the pattern match requests, an identifier associated with PMC 502, and/or any other bookkeeping information. In one implementation, the bookkeeping information may indicate what part of a packet already has been matched to patterns, and such information may be used as a seed to continue to match data in subsequent packets.

DESTROY_MATCH_CONTEXT( )618 may include an interface for invoking a procedure for deallocating a context (e.g., returning the context to a heap) that has been created via CREATE_MATCH_CONTEXT( )616.

REQUEST_MATCH( )620 may include an interface for invoking a procedure for requesting PME 506 to perform a pattern match. In invoking REQUEST_MATCH( )620, PMC 502 may pass, in its argument list, parameters such as, for example, a context (e.g., created by invoking CREATE_MATCH_CONTEXT( )616), an identifier associated with PMC 502, an address of memory at which data to be matched is stored, a set of patterns to match, etc. When PMC 502 invokes REQUEST_MATCH( )620, PMS 504 may temporarily place the pattern match request on a queue before relaying the request to PME 506.

STOP_SESSION( )622 may include an interface for invoking a procedure for requesting PMS 504 to deallocate system resources that are associated with a pattern matching session. As used herein, "pattern matching session" or "session" may refer to a series of pattern match requests and responses that are interrelated by state information (e.g., what portions of data have been matched against sets of patterns). and/or common data. When a pattern match session starts, data that may be referred by pattern match requests during the session may be temporarily stored in PME 506. When the pattern match session terminates, the data may be removed from PME 506.

When PMC 502 invokes one of the interfaces listed in FIG. 6A, PMC 502 may pass information to PMS 504 via an argument list of the interface. The information may include different parameters. For illustrative purposes, two lists of parameters are described below.

Figure 6B:
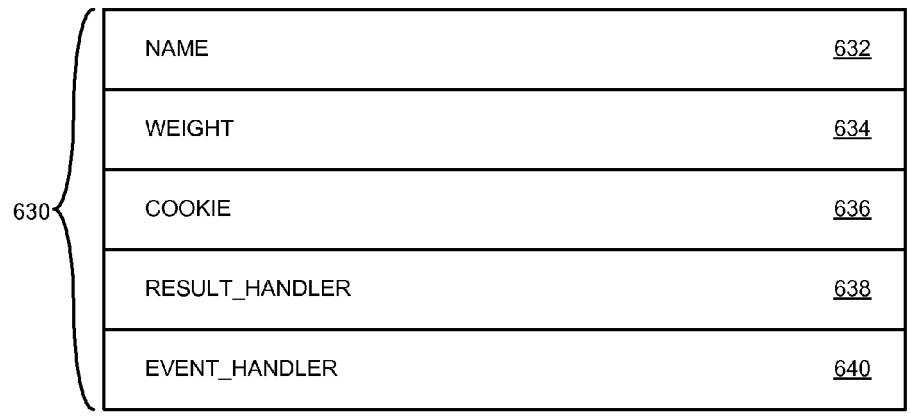
FIG. 6B shows a list of exemplary parameters that the PMC may convey to a pattern matching server (PMS) of FIG. 5.

FIG. 6B shows a list of exemplary parameters 630 that PMC 502 may pass to PMS 504 when PMC 502 invokes REGISTER( )604. As shown, parameters 630 may include NAME 632, WEIGHT 634, COOKIE 636, RESULT_HANDLER 638, and EVENT_HANDLER 640. Depending on the implementation, parameters 630 may include additional, fewer, or different parameters than those illustrated in FIG. 6B.

NAME 630 may include the name of PMC 502 that invokes REGISTER( )604 (e.g., "Intrusion Detection and Prevention System"). WEIGHT 632 may include a numerical value that PMS 504 may use in load-balancing pattern match requests from two or more PMCs 502. COOKIE 636 may include data that reflects states of pattern matching sessions (e.g., what portion of data has been used for a pattern match in the prior pattern match request). RESULT_HANDLER 638 may include a reference and/or address of a procedure that PMS 504 may invoke when PMS 504 obtains a result of a pattern match. EVENT_HANDLER 640 may include a reference and/or address of a procedure that PMS 504 may invoke when PMS 504 generates an event (e.g., occurrence of an error) while PMS 504 performs a task related to matching patterns.

Figure 6C:
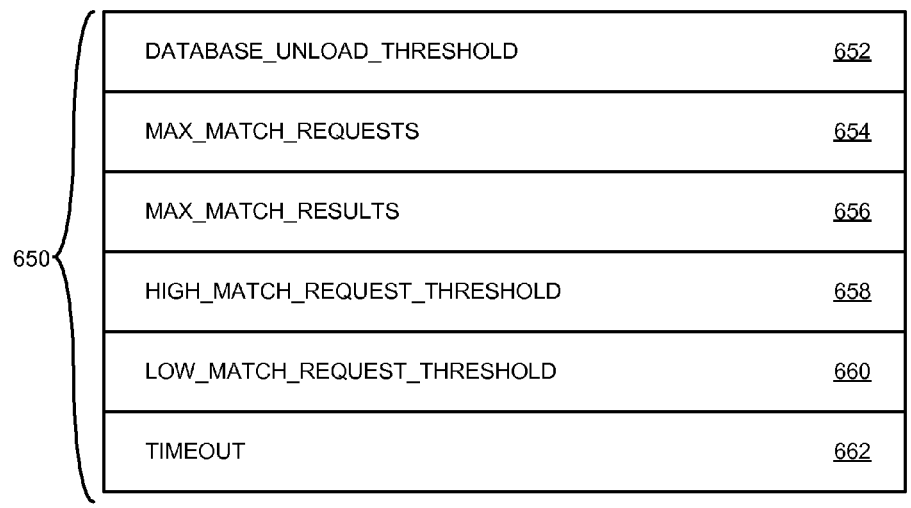
FIG. 6C shows another list of exemplary parameters that the PMC may convey to the PMS of FIG. 5.

FIG. 6C shows a list of exemplary parameters 650 that PMC 502 may pass to PMS 504 when PMC 502 invokes INITIALIZE( )608. As shown, parameters 650 may include DATABASE_UNLOAD_THRESHOLD 652, MAX_MATCH_REQUESTS 654, MAX_MATCH_RESULTS 656, HIGH_MATCH_REQUEST_THRESHOLD 658, LOW_MATCH_REQUEST_THRESHOLD 660, and TIMEOUT 662. Depending on the implementation, parameters 650 may include additional, fewer, or different parameters than those illustrated in FIG. 6C.

DATABASE_UNLOAD_THRESHOLD 652 may indicate a number of pattern databases (e.g., a set of patterns to which data may be compared) that PME 506 may retain in dynamic memory (e.g., RAM) for matching patterns. If PMC 502 requests PME 506 to store more than DATABASE_UNLOAD_THRESHOLD 652 pattern databases in its dynamic memory, PME 506 may swap out the oldest database or the least used database in the dynamic memory. MAX_MATCH_REQUSTS 654 may indicate the maximum number of pattern match requests that may be placed in a waiting queue at PMS 504. The queue will be described below in greater detail. MAX_MATCH_RESULTS 656 may indicate the maximum number of pattern matching results that PMS 504 may provide to PMC 502 in response to a pattern match request.

HIGH_MATCH_REQUEST_THRESHOLD 658 may indicate a threshold that indicates when the waiting queue is nearly full. LOW_MATCH_REQUEST_THRESHOLD 660 may indicate a value below which PMS 504 may generate an event (e.g., for notifying PMC 502) after HIGH_MATCH_REQUEST_THRESHOLD 658 has been reached. TIMEOUT 662 may indicate an amount of time for which a pattern match request may be placed in the waiting queue before PMS 504 generates an event to notify PMC 502 that the pattern match request has timed out.

Returning to FIG. 5, PMS 504 may include hardware and/or software components for queuing pattern match requests from PMC 502, relaying the pattern match requests to PME 506, receiving responses to the pattern match requests from PME 506, and distributing the responses to PMC 502. Further details of PMS 504 are provided below.

PME 506 may receive pattern match requests that are relayed by PMS 504 from PMC 502, and may provide results of matching patterns to PMS 504, which may relay the results to PMC 502. In addition to responding to pattern match requests, PME 506 may respond to control commands from PMC 502, programs and/or scripts that are external to PMC 502, etc.

In one implementation, PME 506 may accept at least two types of pattern match requests. One type of pattern match requests may be independent of other pattern match requests, and, therefore, may be described as being "stateless." Another type of pattern match requests may depend on information/data provided by other pattern match requests, and, therefore, may be described as being "stateful." In a pattern matching session, PME 506 may receive a set of inter-dependent, stateful pattern match requests, via PMS 504, from PMC 502.

When PME 506 receives a stateful pattern match request during a pattern matching session, PME 506 may temporarily save information that is provided by/with the request. For example, assume that PME 506 receives a request to match a portion of data (e.g., a character string "John" within "John Doe") to a known set of patterns. After or while processing the data, PME 506 may temporarily store state information (e.g., what portion of the data has been matched). When PME 506 receives another pattern match request that references a different portion of the data (e.g., "Doe" in "John Doe"), PME 506 may use the state information to perform another pattern match. In one implementation, the state information may be stored in a cookie that may be passed between PMC 502 and PMS 504.

In order to perform pattern matching, PME 506 may store patterns in a memory that is local to PME 506 or in a memory that is shared by PME 506 and other components, such as PMC 502, and PMS 504.

Pattern database 508 may include one or more sets of patterns. The set of patterns in pattern database may be used to detect patterns in data. For example, assume that pattern database 508 includes the pattern "10111000101111110000." Presence of the pattern in data (e.g., "00001111101011100010111111110000000000") may indicate that the data carries a computer virus.

To compare data against a set of patterns in pattern database 508, PMC 502 may request, via PMS 504, PME 506 to load the set of patterns from pattern database 508 in a dynamic memory. In one implementation, PMC 502 may invoke LOAD_PATTERNS( )612 to cause, via PMS 504, PME 506 to load in the set of patterns.

Figure 7:
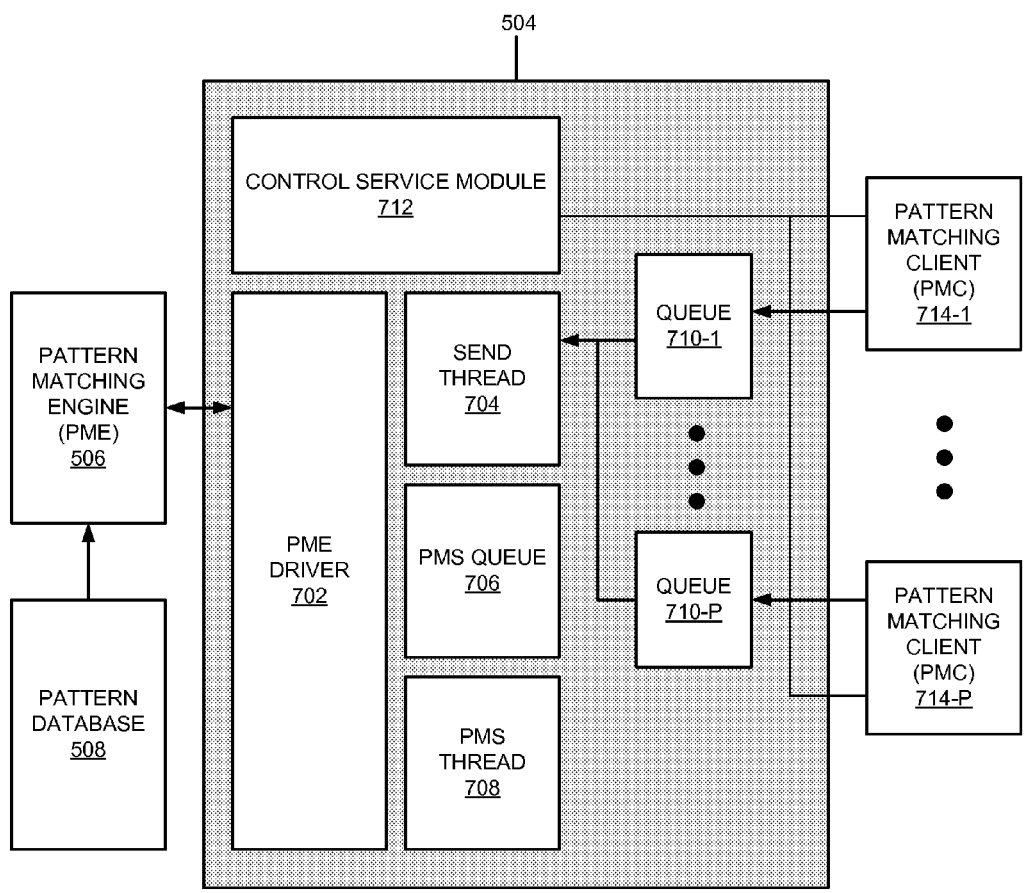
FIG. 7 is a functional block diagram of the exemplary PMS of FIG. 5.

FIG. 7 is a functional block diagram of PMS 504. As shown, PMS 504 may include a PMS driver 702, a send thread 704, a PMS queue 706, a PMS thread 708, queues 710-1 through 710-P (herein collectively referred to as queues 710 and individually as 710-x), and a control service module 712. Depending on the implementation, PMS 504 may include additional, fewer, or different components than those illustrated in FIG. 7. For example, if PME 506 is implemented in software, PMS 504 may not include PME driver 702.

PME driver 702 may include one or more components that may allow PMS 504 to interact with PME 506. For example, PME driver 702 may relay a pattern match request from PMS 504 to PME 506. In some implementations, PME driver 702 may control PME 506 via communication/data paths to which specialized hardware components of PME 506 are connected.

Send thread 704 may include one or more components for removing pattern match requests from queues 710 and sending the removed pattern match requests to PME 506. In removing the pattern match requests from queues 710, send thread 704 may balance loads on queues 710 in accordance with a specific policy or strategy. For example, send thread 704 may remove requests from queues 710 such that each queue 710-x contains approximately an equal number of pattern match requests. To send the pattern match requests to PME 506, send thread 704 may interact with PME driver 702.

PMS queue 706 may provide a buffer for receiving, from PME 506, results of processing pattern match requests. When PME driver 702 relays a result of processing a pattern match request from PME 506, PME driver 702 may temporarily place the result in PMS queue 706. Each result may identify patterns that match data. Without PMS queue 706, if a PMC 502 that requested the pattern match is unable to receive the result, PMS 504 may drop the result or wait for PMC 502 to finish its current task and receive the result.

PMS thread 708 may include software for transferring results of matching patterns, from PMS queue 706 to PMCs 502 that sent corresponding pattern matching requests.

Queue 710-x may receive and/or buffer a pattern match request from a corresponding PMC 502, illustrated as PMC 714-x in FIG. 7. The pattern match request may wait in queue 710-x until send thread 704 delivers the pattern match request to PME 506, via PME driver 702.

Control service module 712 may include one or more components for configuring PMS 504 (e.g., initializing values of parameters, loading sets of patterns from pattern database 508). For example, when PMC 502 invokes interfaces REGISTER( )604, UNREGISTER( )606, INITIALIZE( )608, SHUTDOWN( )610, LOAD_PATTERNS 612, UNLOAD_PATTERNS( ) 614, CREATE_MATCH_CONTEXT( )616, and/or DESTROY_MATCH_CONTEXT( )618, control service module 712 may perform procedures that are associated with each of the interfaces. For instance, as described above, when PMC 502 invokes REGISTER( )604, PMS 504 may allocate system resources for PMC 502, via control service module 712.

In some implementations, if control service module 712 allocates a block of memory for configuring PMS 504, the block may be allocated in a dynamic memory that is shared between PMC 502 and PME 506. When control service module 712 allocates the block in a shared memory, a reference (e.g., an address, a pointer, etc.) to the block may be provided to PMC 502.

Exemplary Process for Matching Patterns

Figure 8:
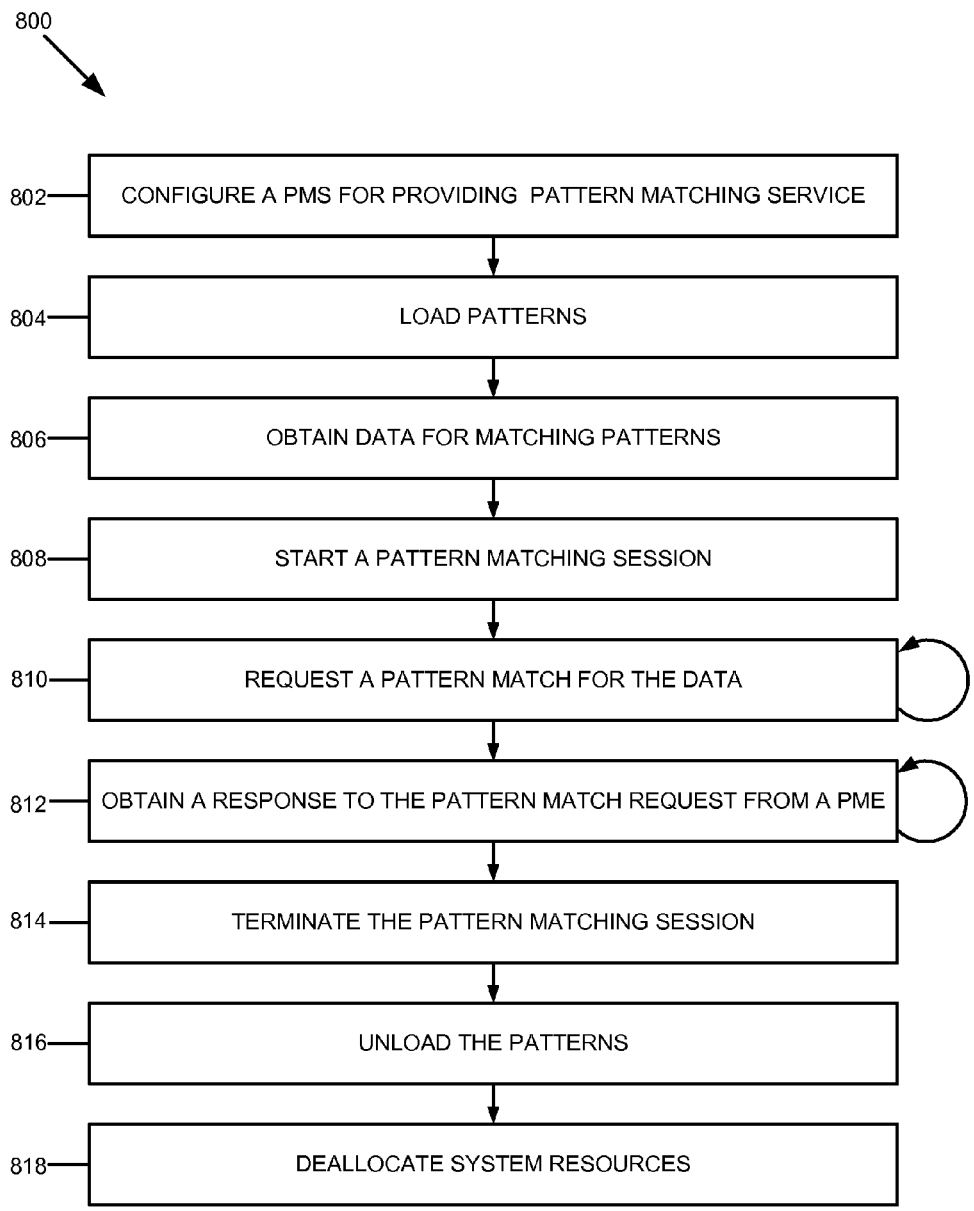
FIG. 8 is flow diagram of an exemplary process for transferring data within the exemplary device of FIG. 2 for matching patterns.

FIG. 8 illustrates a flow diagram of an exemplary process 800 for matching patterns. When a network device, such as device 202-x, receives a packet, the network device may examine one or more portions of the packet (e.g., header, payload, etc.) to ensure that the packet does not pose a security threat. To examine the portions, the network device may perform process 800 to match the portions against known patterns (e.g., a virus pattern).

For the following description, assume that, after service module 306-x powers up, PMS 504 allocates system resources (e.g., locks, memory, semaphores, etc.), instantiates objects (e.g., PMS queue 706), and/or starts threads (e.g., send thread 704, PMS thread 708, etc.).

Process 800 may start at block 802, where PMS 504 may be configured to provide a pattern matching service to a PMC 502 (block 802). Depending on the implementation, PMS 504 may be configured in different ways. For example, in one implementation, PMS 504 may be configured when PMC 502 invokes REGISTER( )604 and/or INITIALIZE( )608. In another implementation, PMS 504 may obtain information that is stored in a persistent storage (e.g., a hard disk) and use the information to configure PMS 504 (e.g., allocate system resources, create objects, etc.).

Patterns may be loaded (block 804). For example, PMC 502 may invoke LOAD_PATTERNS 612. In response, PMS 504 may cause, via PME driver 702, PME 506 to read one or more sets of patterns from pattern database 508 into memory 404. PMS 504 may associate the loaded sets of patterns with PMC 502.

Data may be obtained for matching patterns (block 806). In one implementation, service module 306-x may select a portion of a received packet as data that may be matched against the loaded patterns.

A pattern matching session may be started (block 808). In one implementation, PMC 502 may start a pattern matching session by invoking CREATE_MATCH_CONTEXT( )616 or REQUEST_MATCH( )620. In response to the invocation, PME 506 may maintain state information that is associated with a pattern matching session (e.g., what portion of data that is in a shared memory has been matched to the loaded patterns).

A pattern match may be requested (block 810). To request a pattern match, PMC 502 may copy the data (see the above description of block 806) to a shared memory location. In addition, PMC 502 may request PME 506 to provide a list of patterns that match the data, for example, by invoking REQUEST_MATCH( )620. The request may indicate what portion of the data in the shared memory is to be matched to the loaded patterns.

Figure 9A:
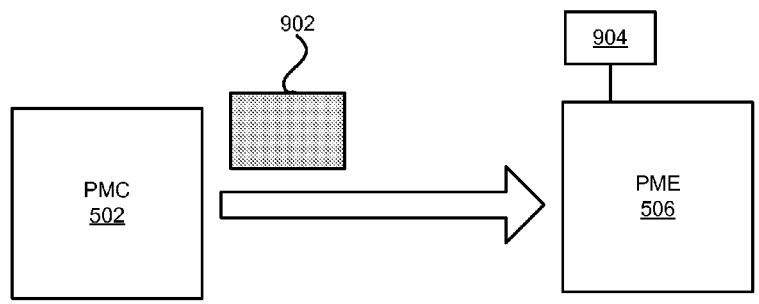
FIGS. 9A through 9C are block diagrams illustrating interactions between an exemplary pattern matching engine (PME) and the exemplary PMC of FIG. 5.

FIG. 9A illustrates PMC 502 sending a pattern match request 902. As shown, the data may be copied into a shared memory 904 that is accessible to PMS 504. When PMS 504 receives pattern match request 902, PMS 504 may place request 902 in queue 710-x. Furthermore, PMS 504 may remove request 902 from queue 710-x and relay request 902 to PME 506.

A response to pattern match request 902 may be obtained from PME 506 (block 812). Upon receiving pattern match request 902, PME 506 may generate a response (e.g., a list of zero or more patterns that match the data in shared memory 904). In addition, PME 506 may send the response to PMS 504, which may temporarily place the response in PMS queue 706. Subsequently, PMS thread 708 may send the response to PMC 502.

In a different implementation, when PMS queue 706 receives the response, PMS thread 708 may invoke a result handler that has been provided by PMC 502. When PMC 502 receives a notification from the result handler that a response has been received, PMC 502 may process the response (e.g., cause device 202-x to drop packets that bear the same source IP address and port number as the packet whose data matches the patterns, send the data to another module for further analysis, etc.).

Figure 9B:
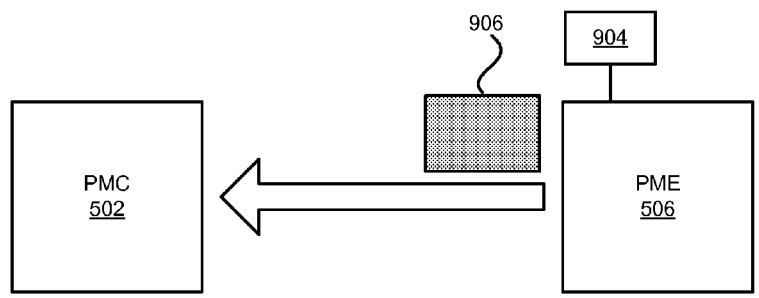
Figure 9C:
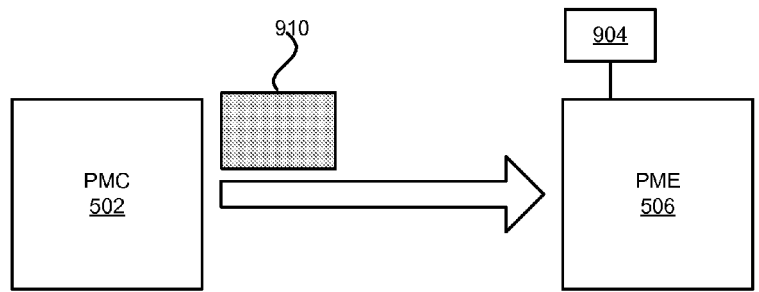

FIG. 9B illustrates PME 506 sending a response 906 to pattern match request 902 to PMC 502. As illustrated, after sending the response, PME 506 may retain the data in shared memory 904. Consequently, in the same pattern matching session, PMC 502 may send additional pattern match requests without copying/resending the data to shared memory 904. This situation is illustrated in FIG. 9C, where PMC 502 sends another pattern match request 910 to PME 506.

The pattern matching session may be terminated (block 814). For example, when PMC 502 has no additional pattern match requests for the data in shared memory 904, PMC 502 may terminate the session by invoking STOP_SESSION( )622. In some implementations, terminating the pattern matching session may not prevent pending results from arriving at PMS 504 from PME 506. Once the results have been received at PMS 504 and notifications have been sent to PMC 502, PMC 502 may determine how or whether to use the results. Patterns may be unloaded (block 816). For example, PMC 502 may unload a set of patterns from PME 506 (e.g., remove the set of patterns from a dynamic memory) by invoking UNLOAD_PATTERNS 614. The set of patterns may have been loaded at block 804. Unloading the set of patterns may render the patterns unavailable for matching patterns.

In some instances, the set of patterns may be unloaded when PMC 502 requests PME 506 to load in a new set of patterns, and PME 506 does not have sufficient memory to load the new set of patterns. In such an instance, PME 506 may "bump off" one of loaded sets of patterns, based on the age of the loaded set (e.g., the oldest set of patterns is bumped) and/or based on use (e.g., the least often accessed set of patterns is bumped). In other instances, the set of patterns may be automatically unloaded when PMC 502, PME 506, and/or service module 306-x shuts down.

System resources that are associated with PMC 502 may be deallocated (block 818). When PMC 502 no longer requires pattern matching services (e.g., service module 306-x and/or PMC 502 shuts down), PMC 502 may invoke procedures such as SHUTDOWN( )610 and UNREGISTER( )606, deallocating the system resources.

EXAMPLE

FIGS. 10A through 10E illustrate an example for reducing data transfer during a pattern matching process. The example is consistent with exemplary process 800 described above with respect to FIG. 8.

Figure 10A:
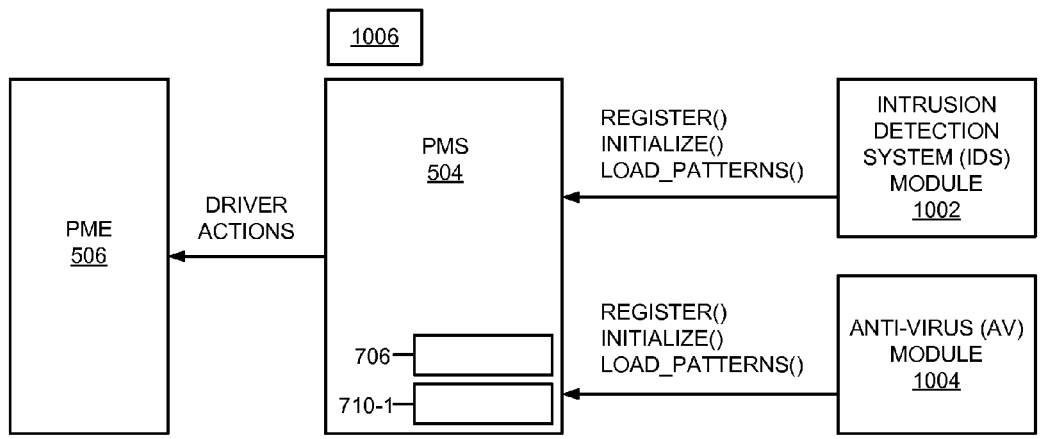
FIGS. 10A through 10D are block diagrams illustrating interactions between the exemplary PME, the exemplary PMS, and PMCs of FIG. 5.

Assume that device 202-x includes a service module 306-x and that service module 306-x includes Intrusion Detection System (IDS) module 1002 and Anti-virus (AV) module 1004, as shown in FIG. 10A. In addition, assume that PMS 504 includes at least two queues, PMS queue 706 and queue 710-1. Further, assume that device 202-x is processing packets in network 200.

Each of IDS module 1002 and AV module 1004 invokes REGISTER( )604, INITIALIZE( )608, and LOAD_PATTERNS 612. PMS 504 allocates system resources, sets parameter values, and causes PME 506 to load a set of patterns for IDS module 1002 and another set of patterns for AV module 1004.

Figure 10B:
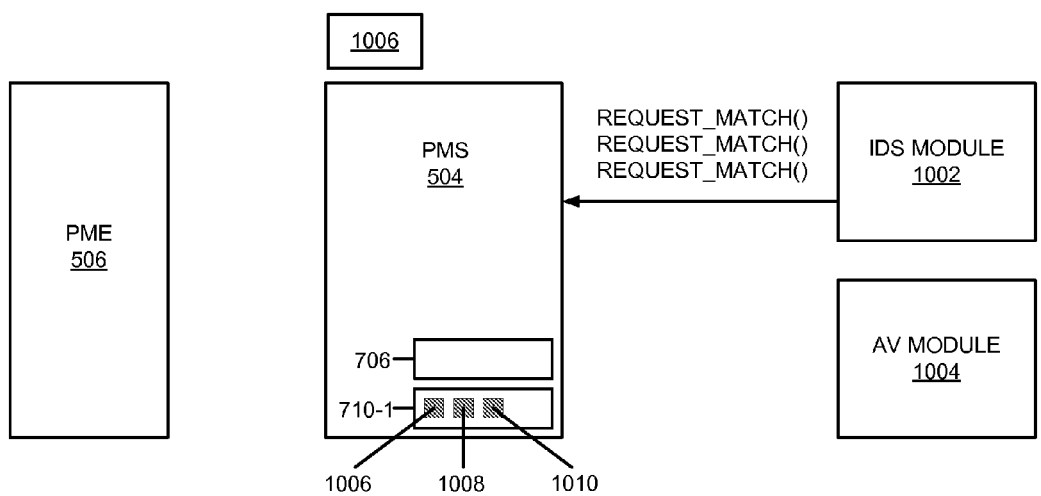

When a packet arrives at device 202-x, device 202-x sends the packet to IDS module 1002. IDS module 1002 extracts a portion of the packet and copies the portion into a shared memory 1006. As shown in FIG. 10B, IDS module 1002 dispatches pattern match requests 1006, 1008, and 1010 by invoking REQUEST_MATCH( )620. Consequently, PMS 504 may place pattern match requests 1006, 1008, and 1010 in queue 710-1.

Figure 10C:
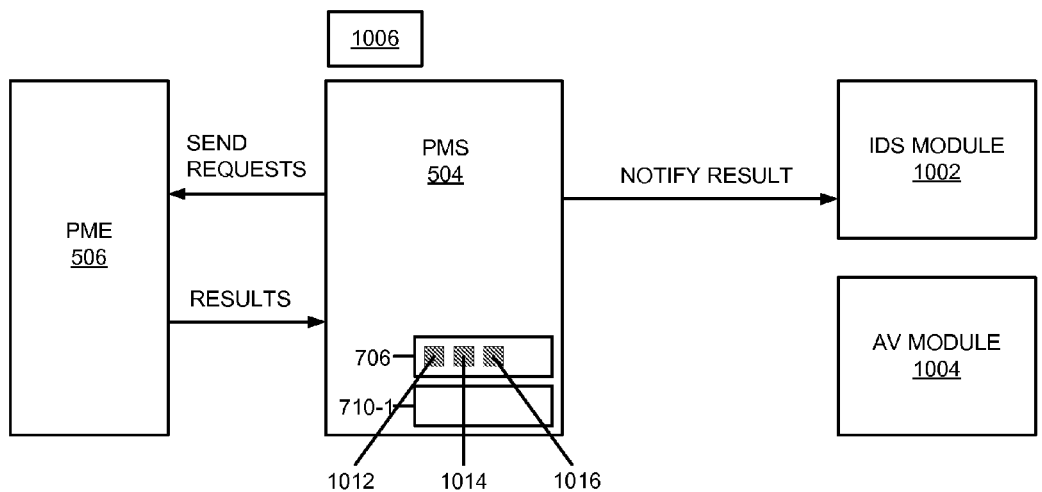

FIG. 10C shows PMS 504 sending requests 1006, 1008, and 1010 to PME 506, and receiving from PME 506, results 1012, 1014, and 1016 of pattern matching the portion. As shown in FIG. 10C, results 1012, 1014, and 1016 are placed in PMS queue 706. As described above, a result, such as results 1012, 1014, and 1015 may include information such as a list of names of patterns or the number of patterns that match the portion. In addition, PMS 504 notifies IDS module 1002 that results 1012, 1014, and 1016 are received.

Figure 10D:
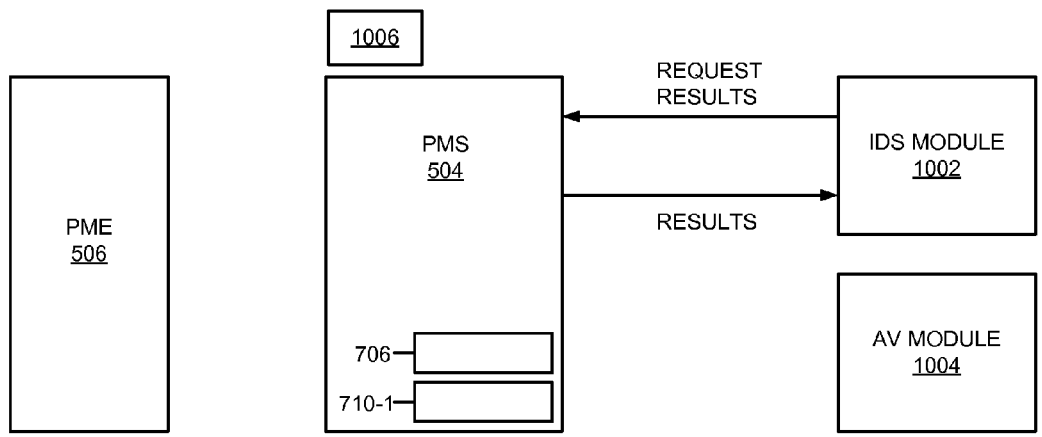

When IDS module 1002 receives the notifications, IDS module 1002 requests PMS 504 to send results 1012, 1014, and 1016. IDS module 1002 receives and processes results 1012, 1014, and 1016 from PMS 504. FIG. 10D illustrates PMS 504 sending results 1012, 1014, and 1016. PMS queue 706 is empty after results 1012, 1014, and 1016 are sent to IDS module 1002.

In the above example, by reducing transfer of data within device 202-x (e.g., copying the data to a shared memory once for a pattern matching session), the device may reduce average bandwidth use of internal communication/data paths and/or may save processing cycles, per pattern match request. Such reduction in resource utilization may enable device 202-x to avoid performance degradations and/or process additional packets in a high traffic environment.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, pattern match APIs 602 may be implemented differently from those illustrated in FIG. 6A For example, in one implementation, invoking an API may explicitly identify the start of a packet via a packet identifier, causing PME 506 to store the packet in its memory. Subsequently, one or more pattern match requests that follow the API invocation may refer to the packet via the same packet identifier. The packet may be removed from the memory when an end-of-packet API is invoked. In another implementation, a pattern match request carrying a packet identifier that is different from a prior packet identifier in an earlier pattern match request may cause PME 506 to remove a packet identified by the earlier packet identifier from PME 506's memory. In yet another implementation, a single API call may result in multiple pattern match requests to PME 506.

In another example, while series of blocks have been described with regard to exemplary processes illustrated in FIG. 8, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving a packet at a network device;
   invoking, by a first hardware component associated with the network device, a first function, the first function causing a second hardware component associated with the network device to cause a third hardware component associated with the network device to load a set of patterns from a database into a dynamic memory to start a pattern matching session;
   obtaining, by the first hardware component, data from the packet;
   storing, by the first hardware component, the data in a memory;
   invoking, by the first hardware component, a second function, the second function sending a request to the third hardware component to match a portion of the data to the set of patterns, the request identifying the portion in the memory;
   accessing, by the third the third hardware component and in response to receiving the request, the portion in the memory based on the request;
   comparing, by the third hardware component, the accessed portion to the set of patterns;
   generating, by the third hardware component, a result by comparing the accessed portion to the set of patterns;
   outputting, by the third hardware component, the result to the second hardware component;
   invoking, by the first hardware component, the second function, the second function sending another request to match another portion of the data to a set of patterns without further storing the data in the memory, the other request identifying the other portion in the memory;
   invoking, by the first component, a third function, the third function ending the pattern matching session; and invoking, by the first component, a fourth function, the fourth function unloading the set of patterns from the dynamic memory when a different set of patterns is loaded into the dynamic memory.

2. The method of claim 1, where invoking the first function includes invoking an application programming interface that identifies a packet, and where invoking the third function includes invoking an end-of-packet application programming interface.

3. The method of claim 1, where invoking the third function includes:
invoking, an application programming interface (API) to match data to a set of patterns, the argument list including a packet identifier that is different from another packet identifier in another list in a prior invocation of the API.

4. The method of claim 1, where invoking the first function includes:
invoking an application programming interface that makes one or more requests to match data to patterns, each request specifying a portion of the data to be matched against one or more sets of patterns.

5. The method of claim 1, further comprising:
registering a client with a pattern matching server.

6. The method of claim 1, further comprising:
inserting the request into a queue; and
inserting the result into a queue.

7. The method of claim 6, where sending the request includes:
load balancing servicing of pattern match requests from one or more clients.

8. The method of claim 1, further comprising:
invoking a handler for notifying a client when the result is generated.

9. The method of claim 1, where generating the result includes:
generating a list of patterns that match the portion of the data.

10. A device comprising:
a plurality of hardware components to:
invoke, by a first component of the plurality of components, a first function, the first function causing a second hardware component of the plurality of hardware components to cause a third hardware component of the plurality of components to load a set of patterns for a pattern matching service into a first memory;
receive a packet;
store, by the first hardware component, data from the packet in a second memory;
invoke, by the first hardware component, a second function, the second function sending requests to the third hardware component for matching patterns, each of the requests identifying a location of a corresponding portion of the data in the second memory and asking for the corresponding portion to be matched to the set of patterns in the first memory;
provide, by the third hardware component, for each of the requests, a result of matching the corresponding portion to the set of patterns;
invoke, by the first component, a third function, the third function ending the pattern matching session; and
invoke, by the first component, a fourth function, the fourth function unloading the set of patterns from the first memory when a different set of patterns is loaded into the first memory.

11. The device of claim 10, where, when invoking the first function, the plurality of hardware components are further to invoke an application programming interface that identifies a packet, and
where, when invoking the third function, the plurality of hardware components are further to invoke an end-of-packet application programming interface.

12. The device of claim 10, where, when invoking the third function the plurality of hardware components are further to:
invoke an application programming interface (API) to match data to a set of patterns, the argument list including a packet identifier that is different from another packet identifier in another list in a prior invocation of the API.

13. The device of claim 10, where, when invoking the first function, the plurality of hardware components are further to:
invoke an application programming interface that makes one or more requests to match data to patterns, each request specifying a portion of the data to be matched against one or more set of patterns.

14. The device of claim 10, where the plurality of hardware components are further to:
register a client with a pattern matching server.

15. The device of claim 10, where the plurality of hardware components are further to:
insert the requests into a queue; and
insert the results into a queue.

16. The device of claim 10, where, when invoking the second request, the plurality of hardware components are further to:
load balancing servicing of pattern match requests from one or more clients.

17. The device of claim 10, where the plurality of hardware components are further to:
invoke a handler for notifying a client when a result is generated.

18. The device of claim 10, where, when providing the result, the plurality of hardware components are further to:
Provide a list of patterns that match the portion of the data.

* * * * *

UNITED STATES PATENT AND TRADEMARK OFFICE
CERTIFICATE OF CORRECTION

| | | |
|---|---|---|
| PATENT NO. | : 8,234,255 B1 | Page 1 of 1 |
| APPLICATION NO. | : 12/194712 | |
| DATED | : July 31, 2012 | |
| INVENTOR(S) | : Krishna Narayanaswamy et al. | |

It is certified that error appears in the above-identified patent and that said Letters Patent is hereby corrected as shown below:

Claim 1, column 12, line 52 should read: "accessing, by the third hardware component and"

Signed and Sealed this
Second Day of October, 2012

David J. Kappos
*Director of the United States Patent and Trademark Office*